Aug. 7, 1928.

M. W. WYSONG 1,679,701

PROCESS OF BUTT WELDING TUBULAR ARTICLES

Filed Feb. 18, 1926      2 Sheets-Sheet 1

Inventor

M. W. Wysong.

By Lacy & Lacy, Attorneys

Aug. 7, 1928. 1,679,701
M. W. WYSONG
PROCESS OF BUTT WELDING TUBULAR ARTICLES
Filed Feb. 18, 1926 2 Sheets-Sheet 2
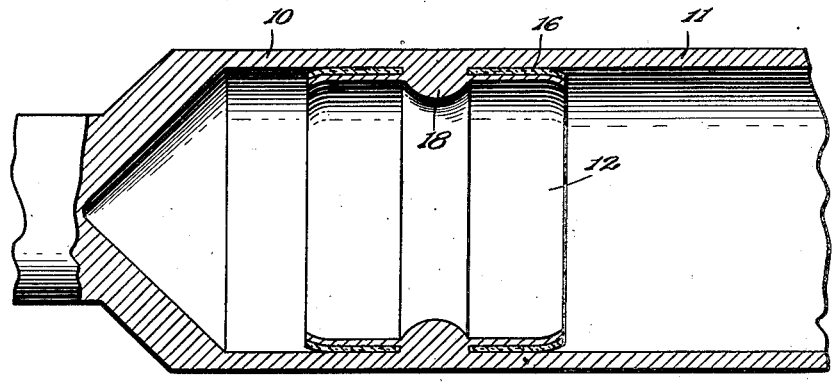
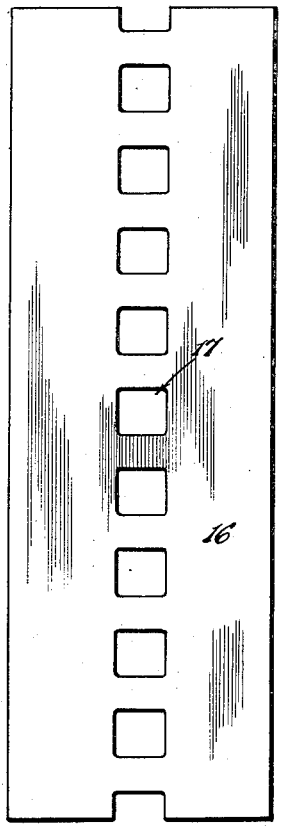
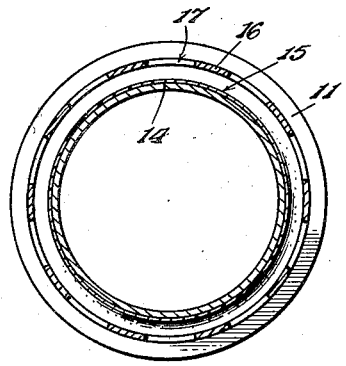
Inventor
M. W. Wysong.

Patented Aug. 7, 1928.

1,679,701

UNITED STATES PATENT OFFICE.

MAXWELL W. WYSONG, OF NORTH PLAINFIELD, NEW JERSEY, ASSIGNOR OF ONE-HALF TO HERBERT C. POOLE, OF NEWARK, NEW JERSEY.

PROCESS OF BUTT-WELDING TUBULAR ARTICLES.

Application filed February 18, 1926. Serial No. 89,151.

This invention relates to an improved flash butt-welded joint and process of welding same and seeks, among other objects, to provide a novel method of uniting tubular shaft members or the like to produce a strong, rigid and permanent joint therebetween.

The invention seeks, as a further object, to provide a process whereby the shaft members may be more quickly fused and united than heretofore.

A further object of the invention is to provide a process wherein the core employed will, incident to the welding operation, be integrally united with the joint for locating and shaping an internal reinforcing bead on the joint as well as preventing the formation of loose metal fragments within the shaft members.

And the invention seeks, as a still further object, to provide a joint wherein the shaped internal reinforcing bead thereof will be located at the point of union of the shaft members for effectually bracing the welded connection between the members.

Other objects of the invention not specifically mentioned in the foregoing will appear during the course of the following description.

In the accompanying drawings:

Figure 3 is a transverse sectional view on the line 3—3 of Figure 2, looking in the direction indicated by the arrows.

Figure 5 is a sectional view showing the finished joint.

Figure 6 is a plan view of the insulating band of the core.

In the usual butt-welding operation, the members to be welded are, as is well known, moved into abutting relation, when electric current is caused to flow through said members while endwise pressure is simultaneously applied for forcing the fusing ends of the members together. In any instance where tubular members are thus welded, as for instance, tubular shaft members, some of the molten metal within the members forms into drops which cool as separate lumps, particles, or fragments of metal confined within the shaft formed by the welded members. In like manner, metal strings and attenuated metal threads are formed within the shaft at the joint. However, to prevent the formation of such strings, particles, and fragments of loose metal incident to the welding operation, the members are usually initially packed with heavy grease, but this expedient is inefficient. Notwithstanding the presence of the packing in the members, drops and strings of metal, nevertheless, form as the members are welded. Consequently, when the shaft is subsequently put into service, the loose fragments of metal cause rattling and noise and the noise becomes accentuated as the packing grease dries. The present invention, therefore, seeks to overcome these disadvantages by preventing the formation of any loose fragments of metal, incident to the welding operation, while, at the same time, the necessity for the use of packing, such as alluded to, is eliminated.

Figure 1:
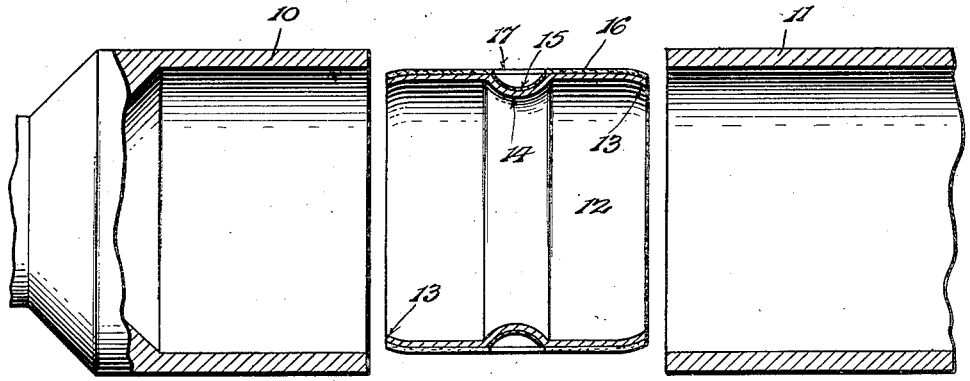
Figure 1 is a longitudinal sectional view showing the ends of shaft members to be united and illustrating the core employed.

Referring now more particularly to the drawings, I have, at 10 and 11 respectively, shown the ends of shaft members to be welded. In the present instance, the member 10 is illustrated as having been bored to accommodate the core employed while the member 11 is illustrated as being of tubular construction. The core referred to, as more particularly illustrated in Figure 1, includes a relatively thin cylindrical metal shell which is preferably of copper and this shell is contracted or reduced in diameter at its ends, as indicated at 13. Medially the shell is pressed inwardly to define an annular groove or channel 14 and covering the wall of this groove is a preferably borax flux coating 15 which, before the core is actually used in the welding operation, is allowed to thoroughly dry upon the shell. Surrounding the shell is a refractory insulating jacket 16 which, as seen in Figure 6, is preferably formed of a strip or band of asbestos. This band is adhesively secured about the shell, preferably by ordinary flour paste, and formed in the band medially thereof is a series of spaced openings 17 which, when the band is applied to the shell to provide the jacket, register with the groove 14 of the shell. Except at these openings, the jacket completely covers the shell throughout its circumference and from end to end thereof.

Figure 2:
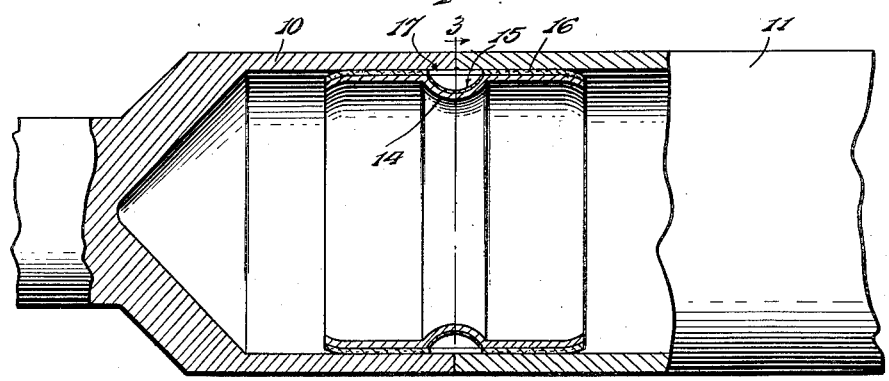
Figure 2 is a sectional view showing the manner in which the core is inserted in the shaft members and the manner in which said members are brought together to effect the welding operation.

In following out the welding operation, the core is, as shown in Figure 2, inserted in the adjacent ends of the members 10 and 11, when the members are moved into abutting alined relation. As will be observed, the core is of a major diameter to quite snugly fit within the members and is centered with respect to the abutting ends of the members so that the channel 14 of the core thus lies in centered relation, immediately beneath the meeting end edges of the members. Having thus disposed the parts, an electric current of low voltage but high amperage is caused to flow through the members 10 and 11, the amperage of the current being regulated to such strength that at the meeting ends of the members, at which point the resistance to the flow of the current is, of course, the greatest, the metal of the members will be caused to fuse. The purpose of the jacket 16 on the shell thus becomes clear. As will be perceived, this jacket will insulate the shell of the core from the members 10 and 11 and prevent bridging of the circuit from one member to the other. Furthermore, since the ends of the shell are contracted, the end edges of the shell are displaced inwardly with respect to the walls of the members 10 and 11 to prevent arcing of the current from either member to the shell.

Figure 4:
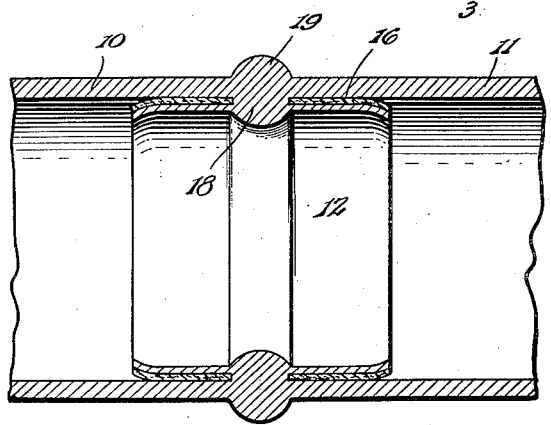
Figure 4 is a sectional view showing the shaft members welded and illustrating the metal bead which is formed externally of the joint.

As the meeting ends of the members 10 and 11 fuse, the molten metal flows through the openings 17 of the jacket 16 of the core into the groove 14 of the core shell 12 and, as shown in Figure 4, the molten metal thus flowing into said groove is shaped and retained by the core to form an internal annular reinforcing bead 18 within the members at the meeting ends thereof. Coincidently, some of the molten metal flows outwardly to form a similar annual bead 19 externally of the members, and upon the appearance of the bead 19 the current is shut off and the members are allowed to cool. But very little endwise pressure upon the members 10 and 11 is required and since the core will prevent the flow of an excess of molten metal into the members at the meeting ends thereof, the strength of the electric current flowing through the members may be regulated to quickly fuse the meeting ends thereof so that the welding operation may be expeditiously accomplished.

It is now to be observed that, during the fusing of the meeting ends of the members 10 and 11, the core will retain the molten metal flowing into said members for not only molding the bead 18, as previously noted, but also locating and centering the bead with respect to the joint between the members as well as preventing the separation from the mass, of any loose drops or particles of the molten metal. Accordingly, the formation of free fragments or lumps of metal within the welded members is effectually prevented while also, the formation of any strings or threads of metal attached to the joint but which might subsequently be released by vibration, is also prevented. As the molten metal flows into the groove 14 of the core shell 12 such metal is, due to the presence of the flux coat 15, caused to amalgamate with the shell so that, as shown in Figure 4, the shell is thus integrally united with the bead 18 and is accordingly permanently and rigidly fixed within the shaft members.

Upon the cooling of the members 10 and 11, the bead 19 is, as shown in Figure 5, preferably filed or ground off to produce a smooth surface externally of the members, when the joint is complete. However, the removal of the bead is largely dictated by expediency, depending upon the neatness required in the appearance of the joint, and, accordingly, in particular instances, said bead may be permitted to remain.

Having thus described the invention, what I claim is:

1. The process of electric welding which consists in disposing meeting ends of members of conductive material to be joined about a core of conductive material having its end portions insulated from the members and its intermediate portion spaced from the members to provide a bead forming cavity, and passing an electric current through the members to fuse the ends together and form an internal strengthening bead for the joined ends in the bead forming cavity.

2. The process of electric welding which consists in disposing hollow members of conductive material in end to end engagement with each other, placing in the contacting end portions of the members a core of conductive material having its end portions provided with insulating jackets fitting snugly in the members and its portion between the jackets spaced from the abutting ends of the members, and passing an electric current through the members while urging the members toward each other to fuse the ends thereof together and between the jackets form an internal reinforcing bead adhering to the core.

In testimony whereof I affix my signature.

MAXWELL W. WYSONG. [L. S.]